(12) United States Patent
Miyagawa et al.

(10) Patent No.: US 6,971,816 B2
(45) Date of Patent: Dec. 6, 2005

(54) MOUNTING DEVICE FOR CONTROL CABLE

(75) Inventors: Masazumi Miyagawa, Yokohama (JP); Masakazu Akahori, Yokohama (JP)

(73) Assignee: Ohi Seisakusho Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/368,098

(22) Filed: Feb. 18, 2003

(65) Prior Publication Data

US 2003/0156898 A1    Aug. 21, 2003

(30) Foreign Application Priority Data

Feb. 18, 2002   (JP)   .......................... P2002-040673

(51) Int. Cl.[7] .............................. B25G 3/36; F16C 1/10; F16L 3/08
(52) U.S. Cl. ..................... 403/397; 403/315; 403/316; 403/319; 403/329; 74/502.4; 74/502.6; 248/74.1; 248/74.2
(58) Field of Search ................................ 403/315, 316, 403/319, 329, 397; 74/500.5, 502.4, 502.6; 248/74.1, 74.2, 65; 70/275, 277, 265; 292/80, 292/84, 253

(56) References Cited

U.S. PATENT DOCUMENTS

| | | | | |
|---|---|---|---|---|
| 4,177,691 A | * | 12/1979 | Fillmore | 74/502.4 |
| 4,635,498 A | * | 1/1987 | Zimmermann et al. | 74/502.4 |
| 4,805,479 A | * | 2/1989 | Brightwell | 74/502.4 |
| 5,207,116 A | * | 5/1993 | Sultze | 74/502.4 |

* cited by examiner

Primary Examiner—Daniel P. Stodola
Assistant Examiner—Victor MacArthur
(74) Attorney, Agent, or Firm—Brenda O. Holmes; Kilpatrick Stockton LLP

(57) ABSTRACT

A mounting device for a control cable, including a stationary member to which a tube of the control cable is fixed, and a connector for connecting the tube to the stationary member. The stationary member has a first wall substantially parallel to an axial direction of the tube and a second wall extending from the first wall in a direction substantially perpendicular to the axial direction. The stationary member is provided with an opening extending over the first and second walls. The connector includes a body portion fitted into the opening on the second wall of the stationary member, and a locking portion inserted from outside into the opening on the first wall of the stationary member to be engaged therewith.

7 Claims, 4 Drawing Sheets

PRIOR ART

MOUNTING DEVICE FOR CONTROL CABLE

BACKGROUND OF THE INVENTION

1. Field of the Invention

The present invention relates to a device for mounting a control cable to a stationary member.

2. Description of the Related Art

In a mounting device for a control cable, as shown in FIG. 7, the internal cable 104 of a control cable 101 is connected to a lever 103 which is pivotally attached to a stationary member 102, and the flexible tube 105 of the control cable 101 is fixed, at its end, onto the stationary member 102.

In order to mount the control cable 101, an end portion 104a of the internal cable 104 is first inserted into a hole 103a provided on the lever 103, secondly, a connector 106 provided at the end of the tube 105 is set in a U-shaped supporting piece 107 of the stationary member 102, with its groove 106a on a circumference thereof engaged with an inner peripheral edge 108 of the supporting piece 107, and thirdly, both sides of the supporting piece 107 are clinched to narrow its entrance, so that the connector 106 is secured to the supporting piece 107.

As described above, the mounting device requires clinching operation to secure the connector 106 to the supporting piece 107 of the stationary member 102, thus increasing workload for mounting the control cable 101.

Moreover, if the supporting piece 107 is poorly clinched, the connector 106 may come off from the peripheral edge 108 of the supporting piece 107 and the tube 105 be detached from the stationary member 102, in case a force applied to the tube 105 in the direction perpendicular to its axial direction.

SUMMARY OF THE INVENTION

In consideration of the problems as described above, the object of the present invention is to provide a mounting device for a control cable, in which a tube of the control cable is easily secured to a stationary member.

An aspect of the present invention is a mounting device for a control cable having a tube and an internal cable therethrough, the mounting device comprising: a stationary member to which the tube of the control cable is fixed at its end, having a first wall substantially parallel to an axial direction of the tube and a second wall extending from the first wall in a direction substantially perpendicular to the axial direction, the stationary member provided with an opening extending over the first and second walls; and a connector provided at the end of the tube of the control cable for connecting the tube to the stationary member, which comprises a body portion fitted into the opening on the second wall of the stationary member, and a locking portion inserted from outside into the opening on the first wall of the stationary member to be engaged therewith.

BRIEF DESCRIPTION OF THE DRAWINGS

The invention will now be described with reference to the accompanying drawings, wherein.

DETAILED DESCRIPTION OF THE PREFERRED EMBODIMENTS

Figure 1:
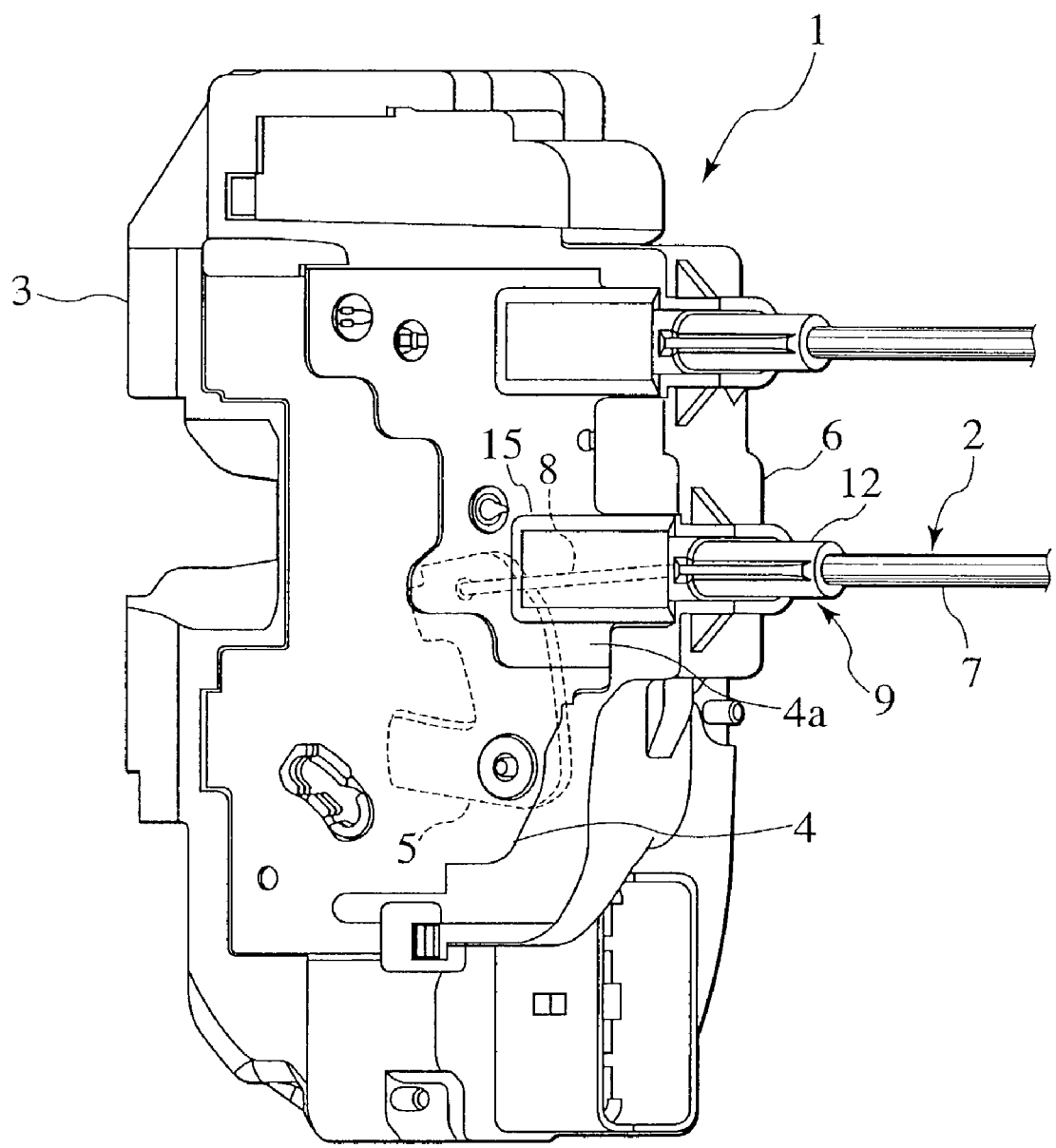
FIG. 1 is a perspective view of a door locking device employing a mounting device for a control cable according to an embodiment of the present invention.

An embodiment of the present invention employed on an automotive door locking device, will be explained below with reference to the drawings.

A door locking device 1 mounted inside an automobile door includes, as shown in FIGS. 1 through 6, a main body 3 which accommodates therein an engagement mechanism for engaging with or disengaging from a striker (not shown) provided on an automobile body, a metal base plate 4 as a stationary member fixed onto the main body 3, an inside lever 5 pivotably attached onto an inner side of the base plate 4 as well as other various levers (not shown), and a synthetic resin housing 6 which is coupled with the base plate 4 to cover the inside lever 5 and the various levers.

A control cable 2 interconnects the door locking device 1 and an inside handle (not shown) provided at a predetermined location on an inner side of the door, and includes a flexible tube 7 and an internal cable 8 inserted through the tube 7 coaxially.

The tube 7 has, on its end to be connected to the door locking device 1, a synthetic resin connector 9 by which the end of the tube 7 is fixed onto the base plate 4 of the door locking device 1. The internal cable 8 extends out from the end of the tube 7, and is connected to the inside lever 5, with an end portion 8a thereof inserted into a connecting hole 5a provided at an end of the inside lever 5.

Figure 2:
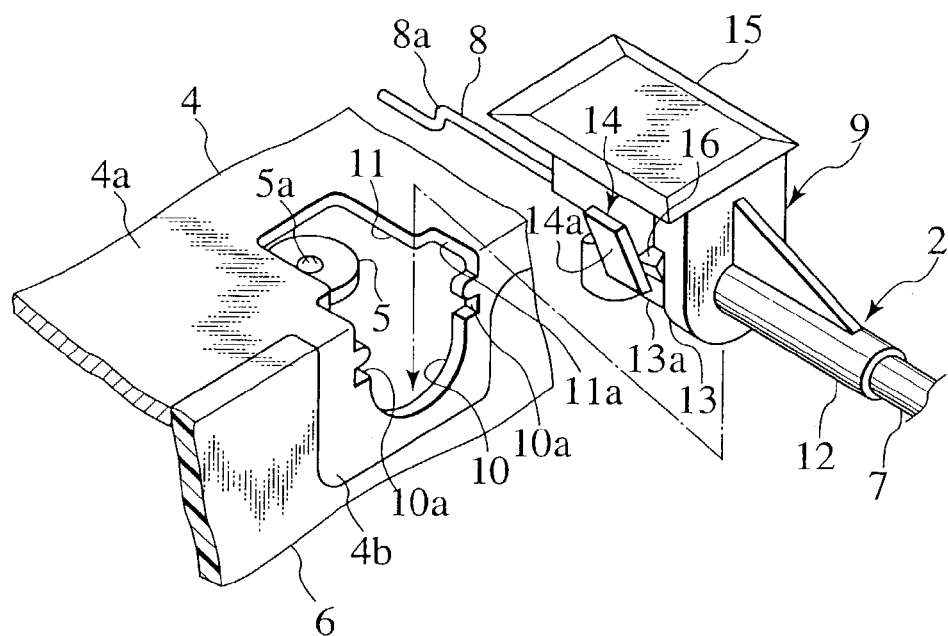
FIG. 2 is an enlarged perspective view of the door locking device of FIG. 1, showing principal portions of the mounting device for a control cable according to the embodiment of the present invention, which includes a connector provided at an end of the control cable and a stationary member to which the control cable is fixed.
Figure 3:
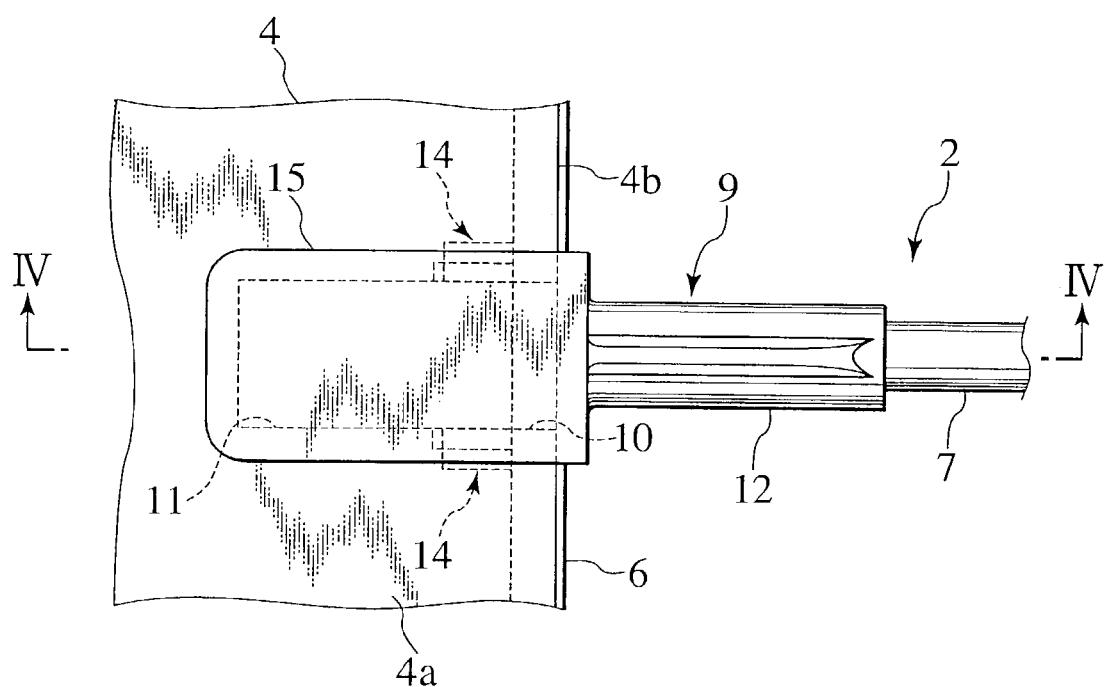
FIG. 3 is a plan view of the principal portions of the mounting device, showing the connector connected to the stationary member thereof.
Figure 4:
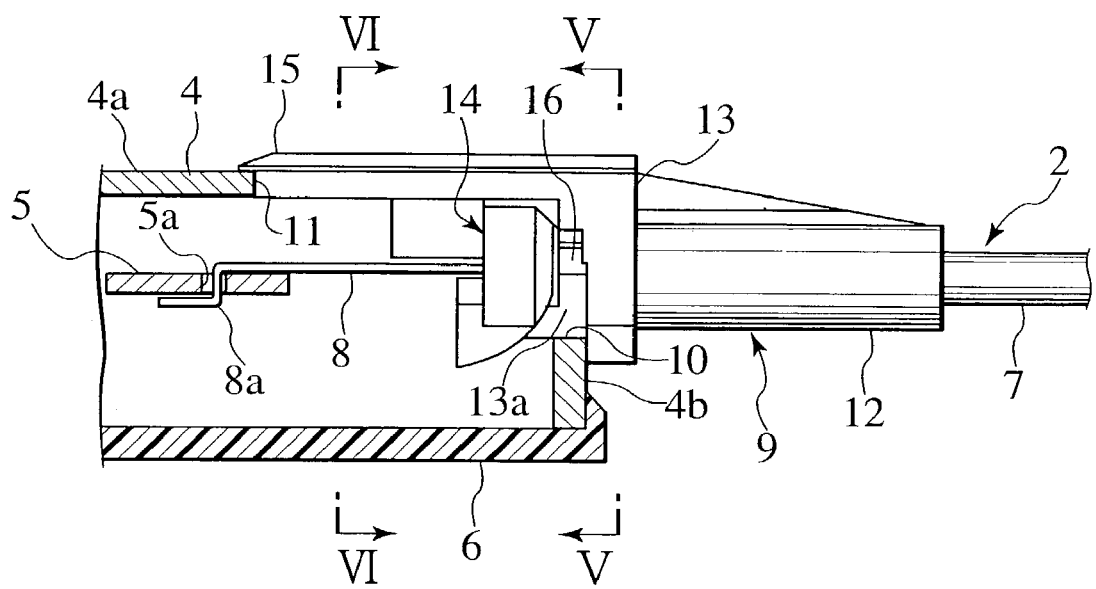
FIG. 4 is a longitudinal sectional view of the principal portions of the mounting device, taken along IV—IV line in FIG. 3.

The base plate 4 in an area where the connector 9 is fixed onto is constituted of, as shown in FIG. 2, a planar base wall 4a extending substantially parallel to an axial direction of the tube 7 of the control cable 2 and a planar right-angled wall 4b extending from one end of the base wall 4a in a direction substantially perpendicular to the axial direction. The base plate 4 is provided with a continuous opening extending over both the base wall 4a and the right-angled wall 4b, which is constituted of an opening 11 on the base wall 4a and an opening 10 on the right-angled wall 4b. The opening 11 is widened on its end closer to the opening 10, forming an entrance portion 11a for receiving locking portions 14 of the connector 9 to be hereinafter described, and on its end opposite to the opening 10, is made narrower than the entrance portion 11a to provide a relatively tight fit between a body portion 13 to be hereinafter described of the connector 9 and the base wall 4a.

FIGS. 3 through 6 show the connector 9 at the end of the control cable 2 being connected to the base plate 4. Note that, left and right ends of the connector 9 in FIGS. 3 and 4 correspond to "distal/front" and "base/rear" ends thereof, respectively, and upper and lower sides of the connector 9 in FIGS. 4 through 6 correspond to "top" and "bottom" thereof, respectively.

The connector 9 includes a tubular portion 12 (shown at left in FIGS. 3 and 4) fitted onto the end of the tube 7 and the body portion 13 provided on distal/front end of the tubular portion 12. The body portion 13 is formed to have, around base/rear end thereof, a groove 13a extending over bottom and lateral sides of the body portion 13 in a position corresponding to a U-shaped peripheral edge around the opening 10 on the right-angled wall 4b. As the body portion 13 is set into the opening 10, the peripheral edge around the opening 10 fits into the groove 13a, whereby the connector 9 is engaged with the right-angled wall 4b and prevented from moving in the axial direction of the control cable 2.

Figure 5:
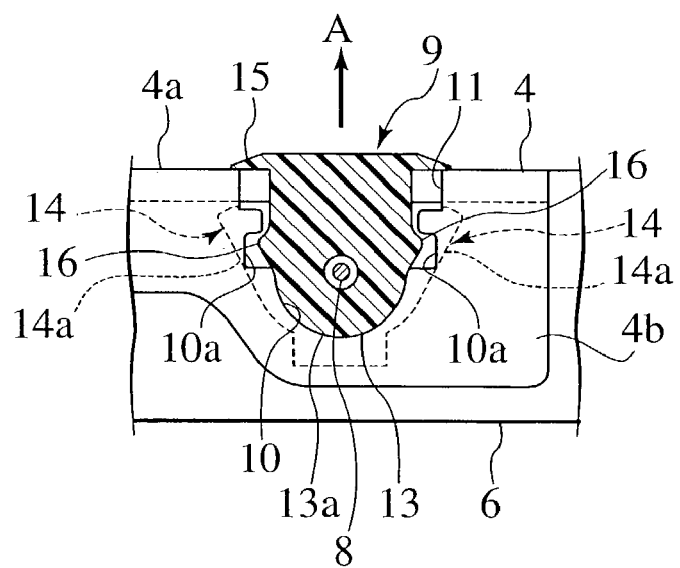
FIG. 5 is a longitudinal sectional view of the principal portions of the mounting device, taken along V—V line in FIG. 4.
Figure 6:
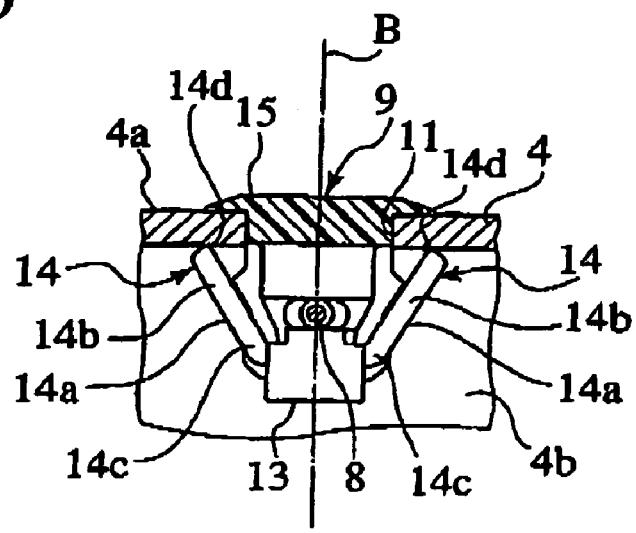
FIG. 6 is a longitudinal sectional view of the principal portions of the mounting device, taken along VI—VI line in FIG. 4.
Figure 7:
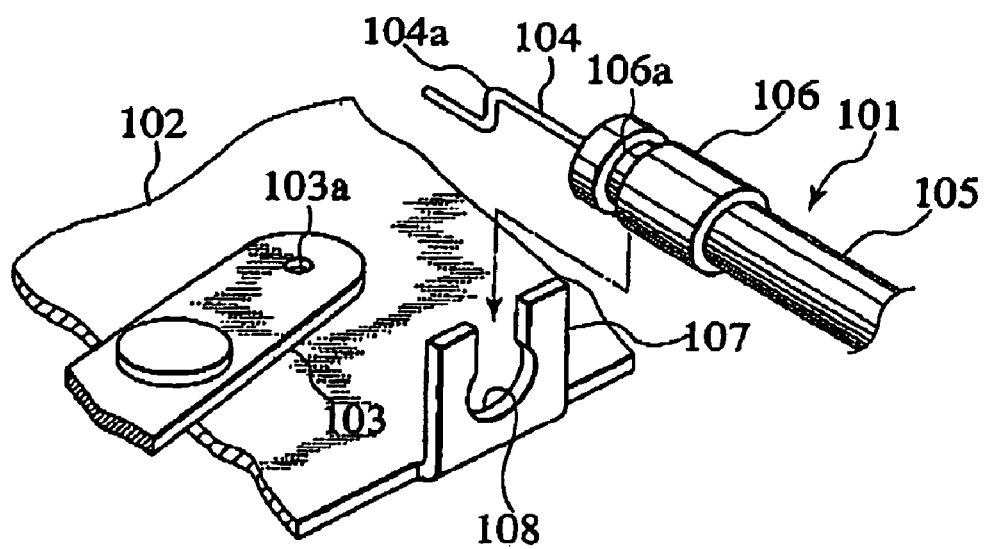
FIG. 7 is a perspective view of a mounting device for a control cable as a related art.

Furthermore, the connector 9 is formed to have, on both lateral sides of the body portion 13, locking portions 14, each respectively including an elastic flat bar 14a which extends upward from the bottom of the body portion 13 in a direction where the flat bars 14a on both lateral sides become spaced away from each other. The flat bars 14a are thus symmetrically arranged in V-shape with respect to a vertical plane B including an axis of the control cable 2, as shown in FIG. 6, in which upper ends 14b of the flat bars 14a are spaced apart from each other with their laterally inner corners 14d positioned on laterally outer side of the inner peripheral edge of the entrance portion 11a, and lower parts 14c of the flat bars 14a are arranged to form a leading end of the locking portions 14 having a width narrower than the entrance portion 11a. The flat bars 14a are elastically deformable in such a manner that the upper ends 14b thereof approach each other, allowing the locking portions 14 to be inserted through the entrance portion 11a. By pushing the body portion 13 into the opening 11, both flat bars 14a are bent laterally inward with their laterally outer sides pushed by the inner peripheral edge of the entrance portion 11a sliding thereon. After the locking portions 14 pass through the entrance portion 11a, when the body portion 13 fits the opening 10, each flat bar 14a springs back to its original shape, as shown in FIGS. 5 and 6, with its upper end 14b thereof being set on an inner side of the peripheral edge of the entrance portion 11a.

Moreover, the body portion 13 is formed to have, around its top, a projecting edge 15 laterally and frontwardly extending in a plane parallel to an outer face of the base wall 4a. The projecting edge 15 lies on an outer side of the peripheral edge of the opening 11 and the entrance portion 11a on the base wall 4a, covering a gap between the body portion 13 and the inner peripheral edge of the opening 11 and the entrance portion 11a, whereby the opening 11 and the entrance portion 11a are closed.

Moreover, the body portion 13 is provided, on upper portions of the groove 13a on lateral sides thereof, with protrusions 16 each arranged in a position corresponding to a recessed portion 10a provided on each of vertically extending sides of the peripheral edge of the opening 10. As the body portion 13 is set into the opening 10, the protrusions 16 engage with the recessed portions 10a to prevent the connector 9 from moving in a direction of the arrow A in FIG. 5 orthogonal to the axial direction of the control cable 2, thus securing the control cable 2 to the door locking device 1.

In order to mount the control cable 2 to the door locking device 1, specifically, to fix the end portion of the tube 7 onto the base plate 4, the internal cable 8 is first connected to the inside lever 5 by inserting the end portion 8a of the internal cable 8, through the opening 11, into the connecting hole 5a of the inside lever 5. Secondly, the body portion 13 of the connector 9 is pushed into the opening 11, with the bottom thereof being directed toward inner side of the base wall 4a. By pushing the body portion 13 into the opening 11, each locking portion 14 is pushed into the opening 11 with each flat bar 14a elastically bent in a manner that their upper ends 14b thereof approach each other, and the groove 13a of the body portion 13 fits onto the peripheral edge of the opening 10.

When the body portion 13 is pushed into the opening 11, after the upper end 14b of each flat bar 14a of the locking portion 14 passes over the peripheral edge around the entrance portion 11a of the base wall 4a, each flat bar 14a springs back laterally outward due to its elasticity, and its upper end 14b locks onto the inner side of the base wall 4a. At the same time, the projecting edge 15 abuts against the outer side of the peripheral edge around the opening 11 and the entrance portion 11a, cooperates to sandwich the base wall 4a together with the locking portions 14, and closes the opening 11 and the entrance portion 11a. Moreover, the opening 10 is closed with the body portion 13 fitted thereinto.

As described above, the connector 9 is engaged with the right-angled wall 4b, with the groove 13a of the body portion 13 fitted onto the peripheral edge around the opening 10, and is prevented from moving in the axial direction of the control cable 2. At the same time, the connector 9 is engaged with the base wall 4a by means of the locking portions 14 which prevents the connector 9 from moving in the direction of the arrow A orthogonal to the axial direction, and the projecting edge 15 which abuts against the outer side of the base wall 4a to prevent the connector 9 from moving in a direction opposite to the direction of the arrow A. Therefore, the connector 9 is secured to the base plate 4, without a play in any direction.

According to the embodiment described above, a mounting device for the control cable 2 comprises: the stationary member 4 to which the tube 7 of the control cable 2 is fixed at its end, having the first wall 4a substantially parallel to the axial direction of the tube 7 and the second wall 4b extending from the first wall 4a in the direction substantially perpendicular to the axial direction, the stationary member 4 provided with an opening extending over the first and second walls; and the connector 9 provided at the end of the tube 7 of the control cable 2 for connecting the tube 7 to the stationary member 4, which comprises the body portion 13 fitted into the opening 10 on the second wall 4b of the stationary member 4, and the locking portion 14 inserted from outside into the opening 11 on the first wall 4a of the stationary member 4 to be engaged therewith.

Therefore, the tube 7 of the control cable 2 can be secured to the stationary member 4, simply by a single operation of inserting the locking portions 14 of the connector 9 for engagement with the stationary member 4 into the opening 11.

Furthermore, the connector 9 includes the projecting edge 15 lying on the outer side of the first wall 4a of the stationary member 4.

Accordingly, the first wall 4a of the stationary member 4 is sandwiched between the locking portions 14 and projecting edge 15 of the connector 9. Therefore, the end portion of the tube 7 for the control cable 2 can be further securely fixed to the stationary member 4.

Furthermore, the projecting edge 15 closes the opening 11 on the first wall 4a of the stationary member 4.

Therefore, invasion of rainwater, dust, or foreign objects to the opening 15 can be prevented.

Furthermore, the stationary member 4 has, on the periphery of the opening 10 on the second wall 4b, the recessed portion 10a, and the connector 9 has, on the body portion 13 thereof, the protrusion 16 for engagement with the recessed portion 10a of the stationary member 4.

Therefore, the end portion of the tube 7 of the control cable 2 can be fixed further securely.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matter contained in Japanese Patent Application No. 2002-040673, filed on Feb. 18, 2002, the disclosure of which is expressly incorporated herein by reference in its entirety.

What is claimed is:

1. A mounting device for a control cable having a tube and an internal cable therethrough, the mounting device comprising:

a stationary member to which the tube of the control cable is fixed at its end, having a first wall substantially parallel to an axial direction of the tube and a second wall substantially perpendicular to the axial direction, the first and second walls forming a corner provided with an opening extending thereover; and a connector provided at the end of the tube of the control cable for connectine the tube to the stationary member at the corner thereof, the connector comprising a body portion configured to be fitted into the opening on the second wall of the stationary member, and a locking portion configured to be simply pushed into the opening on the first wall of the stationary member for engagement therewith, wherein the locking portion has a pair of flat bars arranged symmetrically with respect to a vertical plane including an axis of the control cable;

wherein a space between distal ends of the flat bars is larger than the opening on the first wall; and wherein base ends of the flat bars are arranged to have a width therebetween which is narrower than the opening on the first wall.

2. The mounting device for a control cable according to claim 1, wherein the flat bars of the locking portion are elastically deformable in such a manner that the distal ends of the flat bars approach each other.

3. The mounting device for a control cable according to claim 2, wherein, as the locking portion of the connector is pushed into the opening on the first wall, both flat bars are bent inward with their outer sides pushed by and sliding on the peripheral edge of the opening on the first wall, and wherein after the locking portion passes through the opening on the first wall, each of the flat bars springs back to its original shape, with the distal end thereof being set on an inner side of the first wall.

4. A mounting device for a control cable having a tube and an internal cable therethrough, the mounting device comprising:

a stationary member to which the tube of the control cable is fixed at its end, having a first wall substantially parallel to an axial direction of the tube and a second wall substantially perpendicular to the axial direction, the first and second walls forming a corner with an opening extending thereover and defining an inner space surrounded on two sides by the first and second walls; and a connector provided at the end of the tube of the control cable for connecting the tube to the stationary member at the corner thereof, the connector comprising a body portion configured to be fitted into the opening on the second wall of the stationary member, and a locking portion configured to be simply pushed into the opening on the first wall of the stationary member for engagement therewith, wherein when the connector is engaged with the stationary member, a projecting edge of the connector closes the opening on the first wall of the stationary member so that the locking portion is enclosed within the inner space.

5. The mounting device for a control cable according to claim 4, wherein the stationary member has, on a periphery of the opening on the second wall, a recessed portion, and the connector has, on the body portion thereof, a protrusion for engagement with the recessed portion of the stationary member.

6. The mounting device for a control cable according to claim 4, wherein the locking portion of the connector comprises a pair of flat bars provided on opposite sides of the connector, each of the flat bars extending from a part of the connector in a direction such that distal ends of the flat bars are spaced further apart from each other than the opposite ends of the flat bars are spaced from each other.

7. The mounting device for a control cable according to claim 4, wherein the locking portion of the connector comprises a pair of flat bars ranged symmetrically with respect to a vertical plane including an axis of the control cable.

* * * * *